United States Patent
Sato et al.

(10) Patent No.: US 11,315,290 B2
(45) Date of Patent: Apr. 26, 2022

(54) IMAGE PROCESSING APPARATUS AND IMAGE PROCESSING METHOD

(71) Applicant: CANON KABUSHIKI KAISHA, Tokyo (JP)

(72) Inventors: Masahiro Sato, Tokyo (JP); Hirofumi Urabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 240 days.

(21) Appl. No.: 16/660,196

(22) Filed: Oct. 22, 2019

(65) Prior Publication Data

US 2020/0134882 A1 Apr. 30, 2020

(30) Foreign Application Priority Data

Oct. 26, 2018 (JP) .............................. JP2018-201958

(51) Int. Cl.
*G06T 11/00* (2006.01)
*G06T 7/90* (2017.01)
*G06T 5/20* (2006.01)
*G06T 5/00* (2006.01)

(52) U.S. Cl.
CPC ............ *G06T 11/001* (2013.01); *G06T 5/009* (2013.01); *G06T 5/20* (2013.01); *G06T 7/90* (2017.01); *G06T 2207/20208* (2013.01)

(58) Field of Classification Search
CPC . G06T 11/001; G06T 7/90; G06T 5/20; G06T 5/009; G06T 2207/20208; H04N 5/202
See application file for complete search history.

(56) References Cited

U.S. PATENT DOCUMENTS

| | | | |
|---|---|---|---|
| 10,096,095 B2 | 10/2018 | Sato et al. | |
| 10,880,491 B2 * | 12/2020 | Osuka | ................ H04N 5/23293 |
| 10,917,583 B2 * | 2/2021 | Baar | ........................ G09G 5/10 |

FOREIGN PATENT DOCUMENTS

| | | |
|---|---|---|
| JP | 2017-169097 A | 9/2017 |
| JP | 2017-181762 A | 10/2017 |
| JP | 2018-005069 A | 1/2018 |
| WO | 2017/159123 A1 | 9/2017 |

* cited by examiner

*Primary Examiner* — Phuoc Tran
(74) *Attorney, Agent, or Firm* — Cowan, Liebowitz & Latman, P.C.

(57) ABSTRACT

An image processing apparatus according to the present invention includes at least one memory and at least one processor Which function as: a setting unit configured to he capable of setting any of a plurality of processing modes which include a first processing mode to display an image having a first brightness range and a second processing mode to display an image having a second brightness range which is narrower than the first brightness range and a processing unit configured to generate frame image data, which is a display target, in a first state in which image processing in accordance with a currently set processing mode is performed, and generates a capture image data corresponding to the frame image data in a second state after changing the first state in accordance with the currently set processing mode.

17 Claims, 14 Drawing Sheets

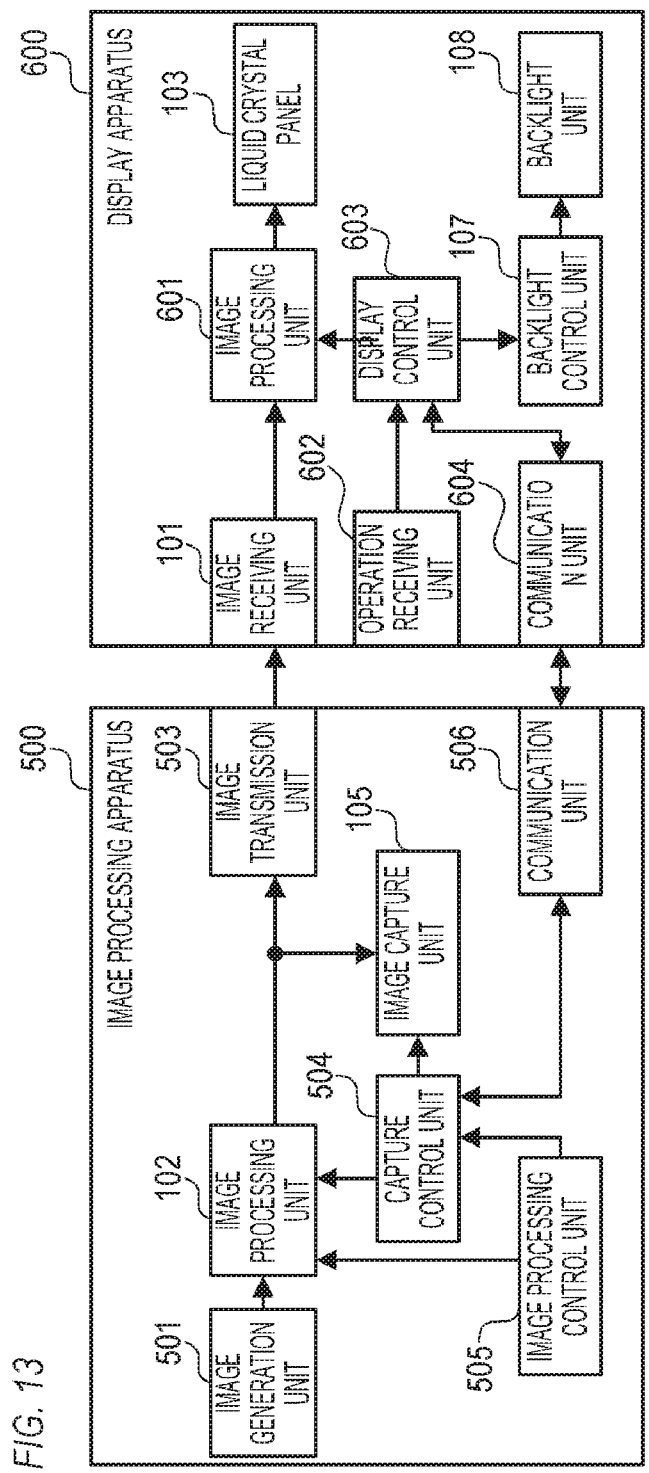

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

Recently display brightness (brightness of a display surface) is getting higher and opportunities to handle images having a wide dynamic range (brightness range) in image creation are increasing. The wide dynamic range is called a "high dynamic range (HDR)" and a dynamic range narrower than HDR is called a "standard dynamic range (SDR)". For example, the maximum brightness (upper limit brightness) of the SDR is 100 cd/m$^2$, and the maximum brightness (upper limit brightness) of the HDR is 10000 cd/m$^2$. For the system of the HDR, a perceptual quantization (PQ) system and a hybrid log-gamma (HLG) system are proposed in ITU-R BT.2100.

The maximum brightness of the HDR is 10000 cd/m$^2$, for example, but a standard display device, of which upper limit display brightness (upper limit of the display brightness) is several hundreds to several thousands cd/m$^2$, and therefore cannot implement a display brightness higher than the upper limit display brightness (e.g. 10000 cd/m$^2$). Therefore, special display devices which can set the display range (display target brightness which is a part or all of the dynamic range of the input image data e.g, brightness range up to 1000 cd/m$^2$, brightness range up to 2000 cd/m$^2$) is used. In such display devices, the brightness within the display range, out of the brightness expressed by the input image data, is displayed with a gradation characteristic conforming to the standard (format) of the input image data. Here a brightness equal to or higher than the maximum brightness (upper limit brightness) of the display range, out of the brightness expressed by the input image data, is displayed so as to be clipped to the maximum brightness. For example, in both cases where the maximum brightness in the display range is 600 cd/m$^2$ and where the maximum brightness in the display range is 1000 cd/m$^2$, brightness 0 to 600 cd/m$^2$ expressed by the input image data is displayed as display brightness 0 to 600 cd/m$^2$.

A capture function is a function to record one frame of image data (frame image data), out of image data (moving image data), as still image data in JPEG or bit map format. Here there is a need to "regenerate and display an image based on the still image data (capture image data) recorded using the capture function, so that appearance at recording (capturing) time is reproduced". However, this appearance cannot be reproduced unless the setting of the display brightness (e.g. light emission brightness (light emission quantity) of the backlight unit disposed in the liquid crystal display apparatus) is reproduced. In a case of a technique disclosed in Japanese Patent Application Publication No. 2018-5069, at capturing, the information on the light emission brightness of the backlight unit (light emission brightness information linked to the capture image data and is recorded in this state. When the image (capture image) based on the capture image data is reproduced and displayed, the light emission brightness of the backlight unit is controlled to match with the light emission brightness at capturing, based on the light emission brightness information.

However most standard image reproduction software cannot read the light emission brightness information or control the light emission brightness of the backlight unit; hence such software cannot reproduce the capture image so as to reproduce the appearance at capturing. As a result, an HDR capture image that captures an HDR image (image having HDR) and an SDR capture image that captures an SDR image (image having SDR) cannot be displayed such that a comparison thereof is possible. In concrete terms, the SDR capture image is displayed brighter than the HDR capture image. Further, a plurality of HDR capture images acquired in different display ranges cannot be displayed such that comparison thereof is possible. In concrete terms, even if the original HDR images of a plurality of HDR capture images are the same, the HDR capture image is displayed brighter as the maximum brightness in a display range at capturing is lower. In other words, the plurality of HDR capture images are displayed with different appearances.

SUMMARY OF THE INVENTION

The present invention provides a technique to acquire capture image data that can be compared with other capture image data.

The present invention in its first aspect provides an image processing apparatus comprising at least one memory and at least one processor which function as:

a setting unit configured to be capable of setting any of a plurality of processing modes which include a first processing mode to display an image having a first brightness range and a second processing mode to display an image having a second brightness range which is narrower than the first brightness range; and a processing unit configured to generate frame image data, which is a display target, in a first state in which image processing in accordance with a currently set processing mode is performed, and generates a capture image data corresponding to the frame image data in a second state after changing the first state in accordance with the currently set processing mode.

The present invention in its second aspect provides an image processing method comprising:

setting any of a plurality of processing modes which include a first processing mode to display an image having a first brightness range and a second processing mode to display an image having a second brightness range which is narrower the first brightness range; and generating frame image data, which is a display target, in a first state in which image processing in accordance with a currently set processing mode is performed, and generates a capture image data corresponding to the frame image data in a second state after changing the first state in accordance with the currently set processing mode.

The present invention in its third aspect provides a non-transitory computer readable medium that stores a program, wherein the program causes a computer to execute:

setting any of a plurality of processing modes which include a first processing mode to display an image having a first brightness range and a second processing mode to display an image having a second brightness range which is narrower than the first brightness range; and generating frame image data, which is a display target, in a first state in which image processing in accordance with a currently set processing mode is performed, and generates a capture image data corresponding to the frame image data in a second state after changing the first state in accordance with the currently set processing mode.

Further features of the present invention will become apparent from the following description of exemplary embodiments with reference to the attached drawings.

BRIEF DESCRIPTION OF THE DRAWINGS

FIG. 13 is a block diagram depicting a configuration example of a display system according to Example 5;

DESCRIPTION OF THE EMBODIMENTS

EXAMPLE 1

Example 1 of the present invention will be described. An example when an image processing apparatus according to the present invention is a liquid crystal display apparatus will be described, but the image processing apparatus may be an apparatus (e.g. personal computer) that is separate from the display apparatus. The display apparatus may be an organic electroluminescence (EL) display apparatus, a plasma display apparatus, a micro-electro mechanical system (MEMS) shutter type display apparatus or the like. The display apparatus may be a projector (projection apparatus).

Figure 1:
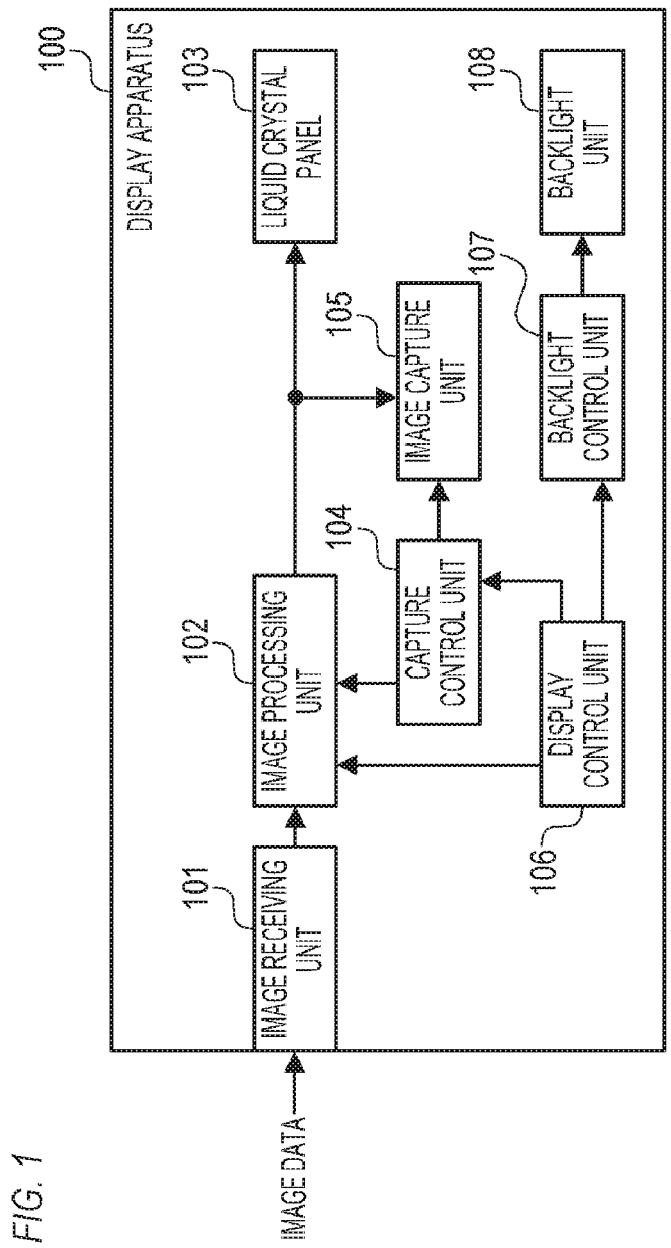
FIG. 1 is a block diagram depicting a configuration example of a display apparatus according to Example 1.

FIG. 1 is a block diagram depicting a configuration example of a display apparatus 100 according to Example 1. The display apparatus 100 includes an image receiving unit 101, an image processing unit 102, a liquid crystal panel 103, a capture control unit 104, an image capture unit 105, a display control unit 106, a backlight control unit 107, and a backlight unit 108.

The image receiving unit 101 acquires (receives) image data. In Example 1, the image receiving unit 101 acquires image data from the external apparatus. The external apparatus is a personal computer, a reproduction apparatus (e.g. blue ray player/recorder, hard disk recorder), a storage medium (e.g. USB memory, external HDD) or the like. In concrete terms, the image receiving unit 101 includes an SDI input terminal conforming to a serial digital interface (SDI) standard, which converts the SDI signal inputted to the SDI input terminal into an image data having a format which can be processed inside the display apparatus 100. Then the image receiving unit 101 outputs the acquired image data (image data acquired by converting the SDR signal) to the image processing unit 102. In concrete terms, the image receiving unit 101 sequentially outputs the frame image data (one frame of image data) based on the refresh rate of the display apparatus 100, the frame rate of the acquired moving image data and the like.

The display apparatus 100 includes a storage medium (e.g. HDD, non-volatile memory), and the image receiving unit 101 may read the image data from the storage medium. The image data acquired by the image receiving unit 101 may be a moving image data or a still image data. In the case where a still image data is acquired, the image receiving unit 101 repeatedly outputs the same image data as the frame image data.

The image processing unit 102 can perform various image processing on the image data (frame image data) outputted from the image receiving unit 101. In Example 1 based on the instruction from the display control unit 106, the image processing unit 102 corrects the color gamut, the electro-optical transfer function (EOTF), the display range and the like of the image data outputted from the image receiving unit 101. The display range is a part of or all of the dynamic range (brightness range) of the image data outputted from the image receiving unit 101, and is a brightness range of the display target. A display target image data (display target frame image data) is generated by the image processing of the image processing unit 102. Then the image processing unit 102 outputs the processed image data (display target image data; display target frame image data) to the liquid crystal panel 103 and the image capture unit 105.

Further, the image processing unit 102 changes the image processing state (e.g. type, number, valid/invalid of image processing; image processing state) in the image processing unit 102 based on the instruction from the capture control unit 104. In the case where the image processing of the image processing unit 102 is omitted, image data that is the same as the image data outputted from the image receiving unit 101 is outputted from the image processing unit 102. The frame image data which is outputted from the image processing unit 102 after the image processing state is changed is used as the capture image data (still image data expressing one still image) or used as a display target frame image data, The output of the image data from the image processing unit 102 to the image capture unit 105 may be performed only when the capture image data is recorded (when the capture control unit 104 sends an instruction to the image processing unit 102). The image processing unit 102 may generate the image data to be outputted to the liquid crystal panel 103 and image data to be outputted to the image capture unit 105 independently. In this case, the image processing unit 102 may generate the image data to be outputted to the liquid crystal panel 103 and the image data to be outputted to the image capture unit 105 without changing the image processing state based on the instruction from the capture control unit 104. The image processing state in which the image data to be outputted to the image capture unit 105 is generated may be a state in which the image processing state, to generate the image data to be outputted to the liquid crystal panel 103, is changed. In terms of simplifying the processing and circuits, it is preferable to generate image data which includes both the image data to be outputted to the liquid crystal panel 103 and the image data to be outputted to the image capture unit 105.

The liquid crystal panel 103 is a display unit that displays an image based on the image data (display target image data) outputted from the image processing unit 102. In concrete terms, the liquid crystal panel 103 transmits light, which is emitted from the backlight unit 108, at a transmittance based on the image data (display target image data) outputted from the image processing unit 102. Thereby the image based on the display target image data is displayed on the display surface of the display apparatus 100.

When a capture instruction in accordance with the user operation performed at the display apparatus 100 (e.g. buttons disposed on the display apparatus 100) is received, the capture control unit 104 outputs the instruction to the image processing unit 102. As a result, the image processing state of the image processing unit 102 is changed. When the capture instruction is received, the capture control unit 104 outputs the instruction to the image capture unit 105 as well.

Based on the instruction from the capture control unit 104, the image capture unit 105 records (captures) the image data (capture image data) outputted from the image processing unit 102 in the storage medium. In concrete terms, the image capture unit 105 generates still image data in JPEG or bit map format from the image data outputted from the image processing unit 102, and records this still image data in the storage medium. The storage medium may be a storage medium included in the display apparatus 100 (e.g. HDD, non-volatile memory) or may be a storage medium detachable from the display apparatus 100 (e.g. USB memory, external HDD).

The display control unit 106 can set any one of a plurality of display modes (processing modes) of the display apparatus 100. When a mode change instruction to the display apparatus 100 in accordance with the user operation is received, the display control unit 106 sets a display mode in accordance with the mode change instruction (user operation) (that is, the currently set display mode is changed). Then based on the newly set display mode, the display control unit 106 outputs instructions to the image processing unit 102 and the backlight control unit 107. In concrete terms, the display mode corresponds to a combination of color gamut, EOTF and display range, and the display control unit 106 notifies the image processing unit 102 on the color gamut, EOTF and the like corresponding to the newly set display mode. As a result, the image processing unit 102 performs image processing to generate image data that includes the color gamut, EOTF and the like corresponding to the newly set display mode. Then the display control unit 106 notifies the maximum brightness (upper limit brightness) in the display range to the backlight control unit 107. Further, the display control unit 106 notifies the newly set display mode to the capture control unit 104.

In Example 1, the plurality of display modes include: a high dynamic range (HDR) mode, a standard dynamic range (SDR) mode, and an HDR to SDR mode. The HDR mode is a display mode to display an HDR image that has a wide dynamic range (HDR), and the SDR mode and the HDR to SDR mode are display modes to display an SDR image that has a narrow dynamic range (SDR) which is narrower than the HDR. For example, the HDR mode corresponds to the color gamut "BT. 2020", the EOTF "HLG", and the display range "brightness range up to 1000 cd/m$^2$". The SDR mode and the HDR to SDR mode correspond to the color gamut "BT. 709", the EOTF "gamma 2.2" and the display range "brightness range up to 100 cd/m$^2$". In the HDR to SDR mode, the HDR image data (image data expressing the HDR image) is converted into the SDR image data (image data expressing the SDR image), and the SDR image based on the SDR image is displayed. In concrete terms, when the HDR to SDR mode is set, the image processing unit 102 performs image processing to convert the color gamut from BT. 2020 to BT 709, image processing to convert the EOTF from HLG to gamma 2.2 and the like, for example.

In Example 1, the display range in the HDR mode is called the "HDR range". The HDR range is changeable, and when the HDR mode is set, the display control unit 106 sets any of the plurality of display ranges as the HDR range. For example, in the case of the mode change instruction to set the HDR mode, any of the plurality of display ranges is specified, and the display control unit 106 sets the display range that is specified in the mode change instruction as the HDR range.

Based on the instruction from the display control unit 106, the backlight control unit 107 outputs a backlight control signal to a backlight unit 108. The backlight unit 108 is a light-emitting unit that irradiates light to the rear face of the liquid crystal panel 103 at a light emission brightness (light emission quantity) based on the backlight control signal outputted from the backlight control unit 107. In concrete terms, the backlight control unit 107 outputs the backlight control signal, which corresponds to the display range maximum brightness (maximum brightness in the display range) notified by the display control unit 106, to the backlight unit 108. Then in accordance with the backlight control signal, the backlight unit 108 emits light at the light emission brightness that can implement the upper limit display brightness (upper limit of the display brightness (brightness of the display surface)), which is the same as the display range maximum brightness. The light emission brightness that can implement the upper limit display brightness, which is the same as the display range maximum brightness, is, for example, a light emission brightness which is the same as the display range maximum brightness. The display range maximum brightness and the upper limit display brightness may be different if the display range maximum brightness and the upper limit display brightness are approximately the same. For example, the display range maximum brightness and the upper limit display brightness may be different if the difference between the display range maximum brightness and the upper limit display brightness is small enough to not be perceived.

An example in the case where the image processing state of the image processing unit 102 is not changed will be described with reference to FIGS. 14A, 14B, 15A and 15B. Hereafter an image based on the capture image data will be called the "capture image". A capture image capturing an HDR image (HDR image data) will be called the "HDR capture image (HDR capture image data)". A capture image capturing an SDR image (SDR image data) will be called the "SDR capture image (SDR capture image data)". In Example 1, it is assumed that the display brightness changes linearly with respect to the increase in the pixel value of the image data.

Figure 14A:
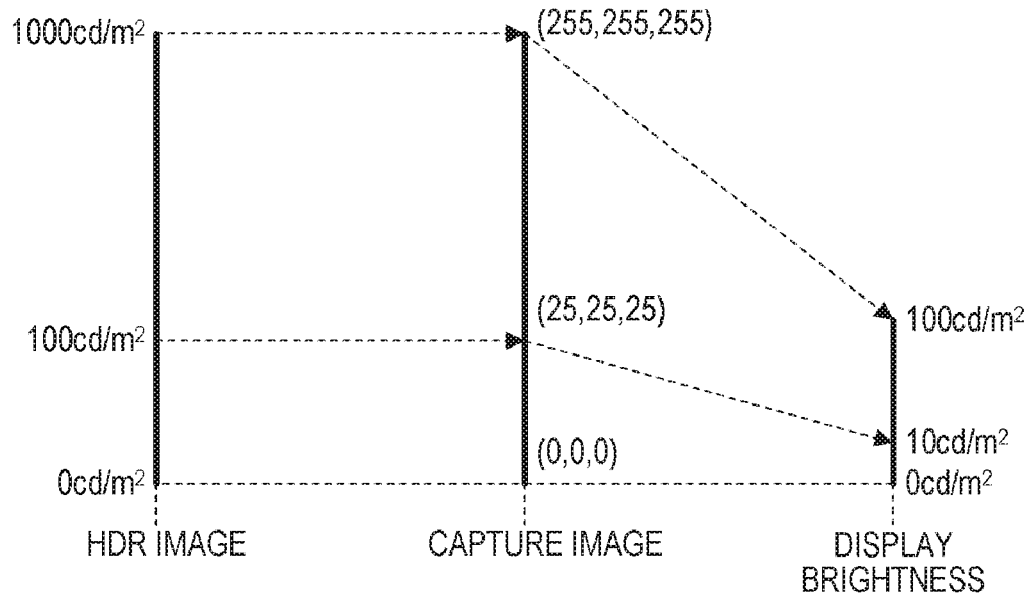
FIGS. 14A and 14B are diagrams depicting an example of a problem that is solved by Examples 1 to 5.

FIG. 14A is an example of the case where an HDR capture image is reproduced using standard image reproduction software and is displayed on an SDR monitor of which upper limit display brightness is 100 cd/m$^2$. FIG. 14A indicates a brightness of the HDR image (brightness expressed by the HDR image data), pixel values of the HDR capture image (pixel values of the HDR capture image data: RGB values) and the display brightness of the SDR monitor. Here the gradation values (R value, G value, B value) of the HDR capture image are assumed to be 8-bit values (0 to 255) respectively.

In the case of capturing an HDR image having a brightness range 0 to 1000 cd/m², for the white of the HDR image of which brightness is 1000 cd/m², the RGB values of the HDR capture image (R value, G value, B value)=(255, 255, 255) are acquired. The RGB values (255, 255, 255) of the HDR capture image are displayed at the display brightness 100 cd/m² on the SDR monitor. For the gray of the HDR image of which brightness is 100 cd/m², the RGB values (25, 25, 25) of the HDR capture image are acquired. The RGB values (25, 25, 25) of the HDR capture image are displayed at the display brightness 10 cd/m² on the SDR monitor. In other words, when the HDR capture image is displayed, the brightness range 0 to 1000 cd/m² of the HDR image is compressed to the brightness range 0 to 100 cd/m² (¹⁄₁₀ of the original brightness range), and the image is displayed.

Figure 14B:
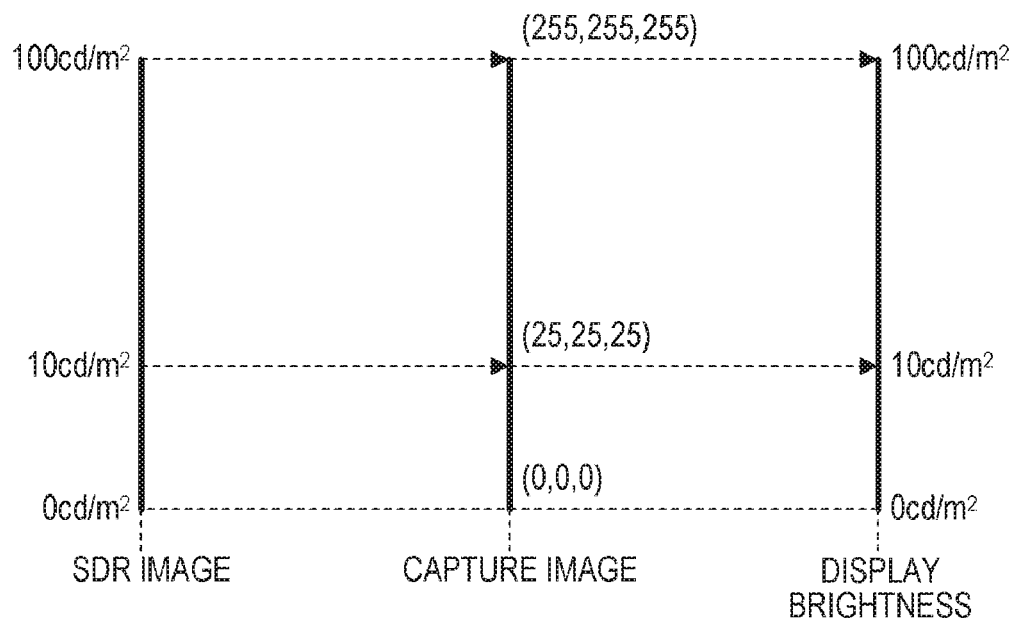

FIG. 14B is an example in the case where an SDR capture image is reproduced using standard image reproduction software and is displayed on an SDR monitor of which upper limit display brightness is 100 cd/m². FIG. 14B indicates the brightness of the SDR image (brightness expressed by the SDR image data), pixel values of the SDR capture image (pixel values of the SDR capture image data; RGB values) and display brightness of the SDR monitor. Here the gradation values (R value, G value, B value) of the SDR capture image are assumed to be 8-bit values (0 to 255) respectively In the case of capturing an SDR image having a brightness range of 0 to 100 cd/m², for the white of the SDR image of which brightness is 100 cd/m², the RGB values of the SDR capture image (255, 255, 255) are acquired. The RGB values (255, 255, 255) of the SDR capture image are displayed at the display brightness 100 cd/m² on the SDR monitor. For the gray of the SDR image of which brightness is 10 cd/m², the RGB values (25, 25, 25) of the SDR capture image are acquired. The RGB values (25, 25, 25) of the SDR capture image are displayed at the display brightness 10 cd/m² on the SDR monitor. In other words, when the SDR capture image is displayed, the brightness range 0 to 100 cd/m² of the SDR image is displayed without being compressed.

In this way, the brightness 100 cd/m² of the HDR image and the brightness 100 cd/m² of the SDR image should be the same, but the HDR capture image is displayed at 10 cd/m², and the SDR capture image is displayed at 100 cd/m². In other words, the SDR capture image is displayed brighter than the HDR capture image. Therefore, the HDR capture image and the SDR capture image cannot be compared with each other.

Figure 15A:
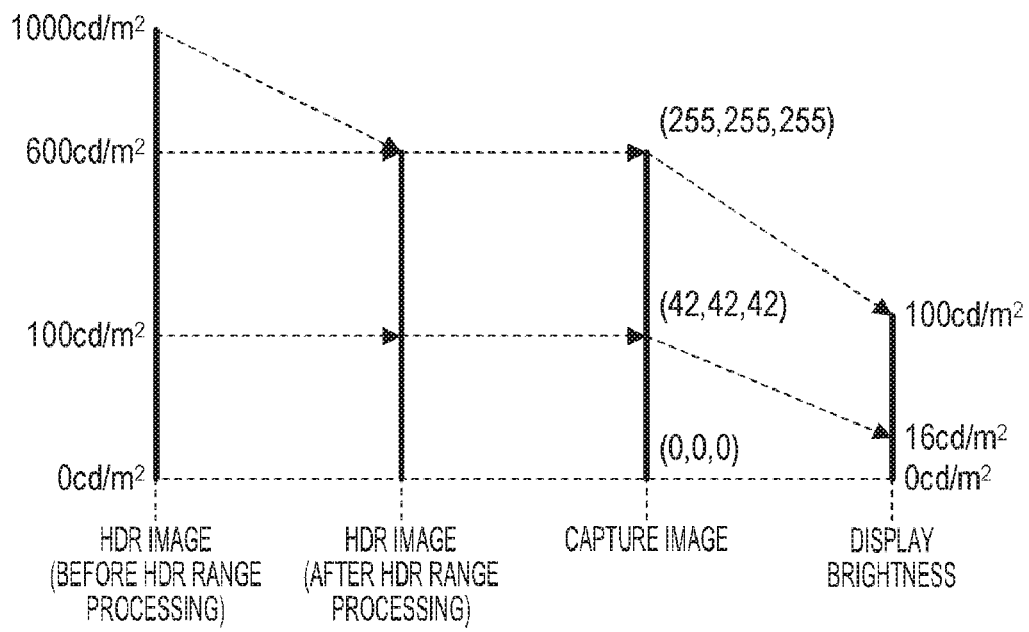
FIGS. 15A and 15B are diagrams depicting an example of a problem that is solved by Examples 1 to 5.

FIG. 15A is an example of the case where an HDR capture image, captured at the display range maximum brightness (upper limit display brightness) 600 cd/m², is displayed on the SDR monitor. If the display range is set, the image processing unit 102 performs image processing (HDR range processing) to convert the brightness range of the HDR image into the display range when the HDR range is displayed. FIG. 15A indicates the brightness of the HDR image before the HDR range processing, the brightness of the HDR image after the HDR range processing, the pixel values (RGB values) of the HDR capture image, and the display brightness of the SDR monitor.

In the case where the display range maximum brightness is 600 cd/m², the brightness range 0 to 1000 cd/m² of the HDR image is compressed to the display range 0 to 1000 cd/m². In concrete terms, the brightness 600 to 1000 cd/m² of the HDR image is converted into 600 cd/m² (clip processing: HDR range processing). Therefore, when the brightness of the HDR image is 600 cd/m², the RGB values (255, 255, 255) of the HDR capture image are acquired. The RGB values (255, 255, 255) of the HDR capture image are displayed at the display brightness 100 cd/m² on the SDR monitor. When the brightness of the HDR image is 100 cd/m², the RGB values (42, 42, 42) of the HDR capture image are acquired. Then the RGB values (42, 42, 42) of the HDR capture image are displayed at the display brightness 16 cd/m² on the SDR monitor.

Figure 15B:
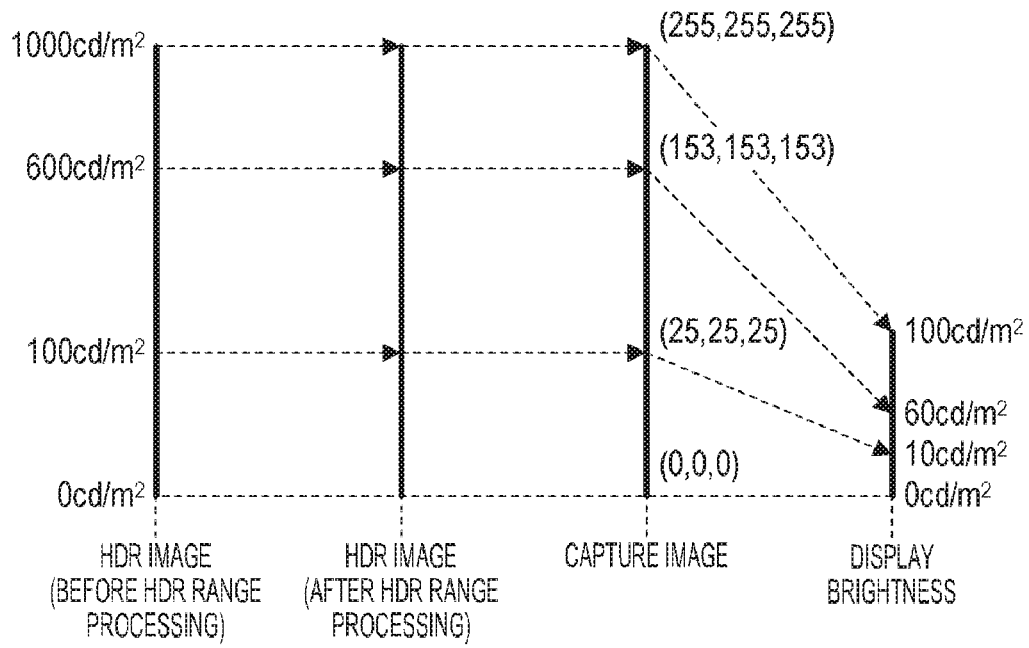

FIG. 15B is an example in the case where an HDR capture image, captured at the display range maximum brightness 1000 cd/m², is displayed on the SDR monitor. FIG. 15B indicates a brightness of the HDR image before the MDR range processing, brightness of the HDR image after the HDR range processing, pixel values (RGB values) of the HDR capture image, and the display brightness of the SDR monitor.

In the case where the display range maximum brightness is 1000 cd/m², the brightness range 0 to 1000 cd/m² of the HDR image, which is the same as the display range 0 to 1000 cd/m², is displayed without being compressed. Therefore, when the brightness of the HDR image is 1000 cd/m², the RGB values (255, 255, 255) of the HDR capture image are acquired. Then the RGB values (255, 255, 255) of the HDR capture image are displayed at the display brightness 100 cd/m² on the SDR monitor. When the brightness of the HDR image is 600 cd/m², the RGB values (153, 153, 153) of the HDR capture image are acquired. Then the RGB values (153, 153, 153) of the HDR capture image are displayed at the display brightness 60 cd/m² on the SDR monitor. When the brightness of the HDR image is 100 cd/m², the RGB values (25, 25, 25) of the HDR capture image are acquired. Then the RGB values (25, 25, 25) of the HDR capture image are displayed on the SDR monitor at the display brightness 10 cd/m².

In this way, when the brightness of the HDR image is 600 cd/m², the HDR capture image at the display range maximum brightness 600 cd/m² is displayed at 100 cd/m², and the HDR capture image at the display range maximum brightness 1000 cd/m² is displayed at 60 cd/m². In other words, even if the original HDR images (HDR images before HDR range processing) among a plurality of HDR capture images are the same, the HDR capture image is displayed brighter as the display range maximum brightness is lower, that is, the plurality of HDR capture images are displayed at different appearances.

Therefore in Example 1, when the capture instruction is received, the capture control unit 104 outputs an instruction to the image processing unit 102 so that the image processing state is changed in accordance with the currently set processing mode. For example, in the cases of FIGS. 14A, 14B, 15A and 15B, the correspondence between the brightness of the capture target image (SDR image or HDR image (after HDR range processing)) and the pixel values of the capture image changes depending on the state. In Example 1. the image processing state is changed so that this correspondence becomes constant (does not change). Thereby a capture image that can be compared with other capture images can be acquired. If this correspondence is approximately constant, this correspondence may be different among the states. For example, this correspondence may change among the states as long as a capture image, that can be compared with other capture images, can be acquired. The correspondence in a certain state may or may not be closer to the correspondence in another state.

Figure 2:
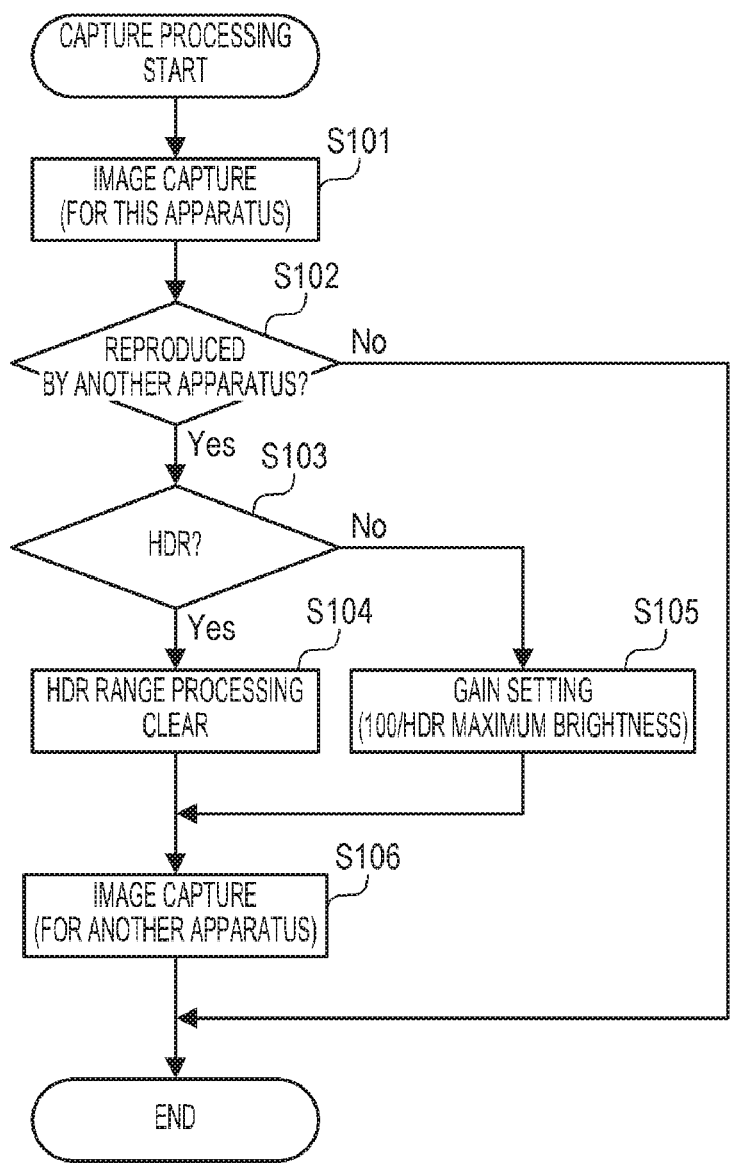
FIG. 2 is a flow chart depicting an example of the capture processing according to Example 1.

FIG. 2 is a flow chart depicting an example of capture processing (processing to acquire and record capture image data) performed by the display apparatus 100. The capture processing in FIG. 2 is implemented in accordance with the capture instruction (capture operation).

in step S101, the capture control unit 104 outputs an instruction to the image capture unit 105, whereby the image capture unit 105 records (captures) the image data, outputted from the image processing unit 102, in a storage medium as the capture image data. The capture image data recorded in step S101 is image data before the image processing state of the image processing unit 102 is changed, and is, for example, image data generated only by the image processing in accordance with the currently set display mode. The capture image data recorded in step S101 is, for example, image data to reproduce the capture image in the display apparatus 100.

In step S102, the capture control unit 104 determines whether or not the capture image is reproduced by another apparatus. For example, the capture control unit 104 sets whether or not the capture image is reproduced by another apparatus, in accordance with the user operation performed at the display apparatus 100. Then the capture control unit 104 determines whether or not the capture image is reproduced by another apparatus in accordance with the current setting. Processing advances to step S103 if it is determined that the capture image is reproduced by another apparatus or processing ends if not. The method of determining whether or not the capture image is reproduced by another apparatus is not especially limited. Instead of determining whether or not the capture image is reproduced by another apparatus, processing may advance assuming that the capture image is reproduced by another apparatus.

In step S103, the capture control unit 104 determines whether the capture target image (image data generated and outputted by the image processing unit 102) is the HDR image or the SDR image in accordance with the currently set display mode (display mode notified from the display control unit 106). If the display mode is HDR mode, the capture target image is determined as the HDR image, and processing advances to step S104. And if the display mode is not the HDR mode (if the display mode is SDR mode or HDR to SDR mode), the capture target image is determined as the SDR image, and processing advances to step S105. The determination in step S103 is also regarded as "the determination whether or not the currently set display mode is the HDR mode".

In step S104, the capture control unit 104 instructs the image processing unit 102 to clear the HDR range processing (clip processing). Thereby the image processing unit 102 no longer performs the HDR range processing (image processing state is changed).

in step S105, the capture control unit 104 calculates the gain value based on the SDR maximum brightness and the HDR range maximum brightness using the following Expression 1, and notifies the calculated gain value to the image processing unit 102. This allows the image processing unit 102 to perform processing to multiply each pixel value of the image data by the gain value notified from the capture control unit 104 (image processing state is changed). The HDR maximum brightness is the maximum brightness, upper limit brightness or the like of the HDR image. The SDR maximum brightness is the maximum brightness (upper limit brightness) in the brightness range of the SDR image, can be 100 cd/m². The SDR maximum brightness may be specified by the user. Therefore, according to Expression 1, the ratio between the upper limit brightness of the SDR image and the HDR maximum brightness is calculated as the gain value. The HDR maximum brightness is higher than the upper brightness of the SDR image, hence according to Expression 1, a gain value that is smaller as the HDR maximum brightness is higher, and that is smaller than 1, is calculated. Therefore, each pixel value is decreased by multiplying each pixel value of the image data by the gain value. The method of decreasing the pixel value is not limited to this, For example, the pixel value may be decreased by subtracting an offset value from the pixel value.

$$\text{Gain value} = \text{SDR maximum brightness}/\text{HDR maximum brightness} \quad \text{(Expression 1)}$$

A concrete example of the HDR maximum brightness will be described. In the case where the HDR to SDR mode is set, the maximum brightness (upper limit brightness) the brightness range of the original HDR image data (HDR image data received by the image receiving unit 101) can be the HDR maximum brightness. In the case where the original HDR image data is the HLG system, 1000 cd/m² can be the HDR maximum brightness, and in the case where the original HDR image data is the PQ system, 10000 cd/m² can be the HDR maximum brightness. In the case where the maximum content light level (MaxCLL), which is the maximum brightness in the content, is included in the metal data of the original HDR image data, the MaxCLL may be the HDR maximum brightness. In the case where the SDR mode is set, the HDR maximum brightness may be specified by the user. The HDR maximum brightness may also be the maximum brightness in the brightness range of the HDR image data, which the image receiving unit 101 received the last time, or MaxCLL of this HDR image data.

In step S106, the capture control unit 104 outputs an instruction to the image capture unit 105, whereby the image capture unit 105 records (captures) the image data outputted from the image processing unit 102 in the storage medium as the capture image data. The capture image data recorded in step S106 is image data after the image processing state of the image processing unit 102 is changed in step S104 or step S105. In concrete terms, in the case where the capture target image is the HDR image, processing in step S104 is performed, hence capture image data on which the HDR range processing was not performed (brightness range was not converted) is acquired. In the case where the capture target image is the SDR image, the processing in step S105 is performed, hence the capture image data, on which image processing to decrease each pixel value by the gain value was performed, is acquired. The capture image data that is recorded in step S106 is image data to reproduce the capture image by another apparatus, for example.

Figure 3:
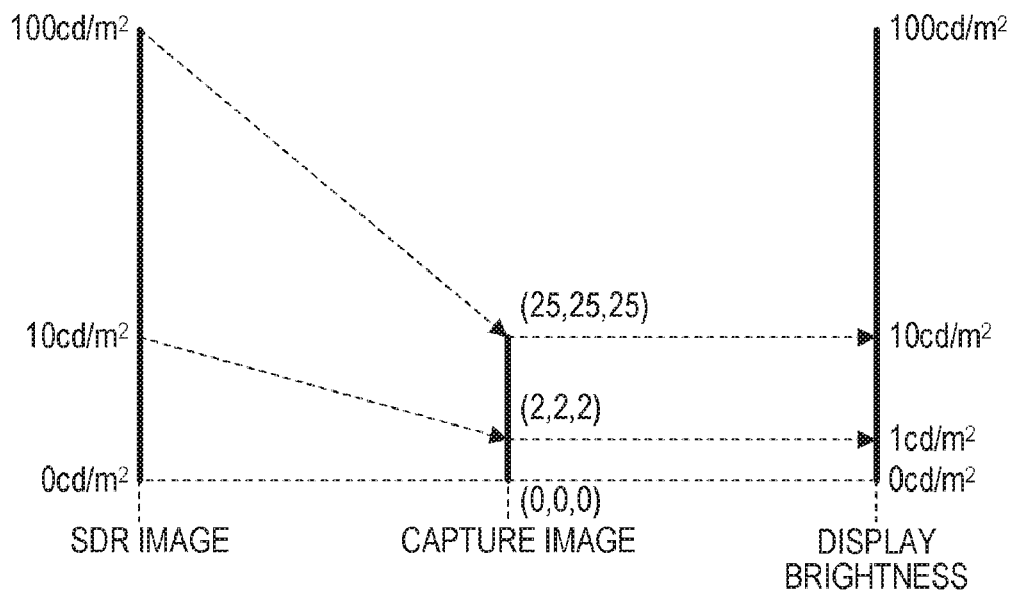
FIG. 3 is a diagram depicting an example of capturing an SDR image according to Example 1.

The effect of Example 1 will be described with reference to FIGS. 3 and 4. FIG. 3 is an example when the SDR capture image (SDR capture image recorded in step S106 in FIG. 2) is reproduced by standard image reproduction software, and is displayed on an SDR monitor, of which upper limit display brightness is 100 cd/m². FIG. 3 indicates the brightness of the SDR image, pixel values (RGB values) of the SDR capture image and the display brightness of the SDR monitor.

Here it is assumed that the HDR to SDR mode is set, and the HDR image data in the HLG system has been converted into the SDR image data. It is also assumed that the HDR maximum brightness is 1000 cd/m², and 0.1 is calculated as the gain value (step S105 in FIG. 2).

For the brightness 100 cd/m² of the SDR image, the pixel values of the SDR capture image in the example of FIG. 14B are RGB values (255, 255, 255). In Example 1, on the other hand, each pixel value is decreased by the gain value 0.1, whereby the pixel values of the SDR capture image become RGB values (255×0.1, 255×0.1, 255×0.1)=(255, 255, 255). The RGB values (25, 25, 25) of the SDR capture image are displayed on the SDR monitor at the display brightness 10 $cd/m^2$.

Figure 4:
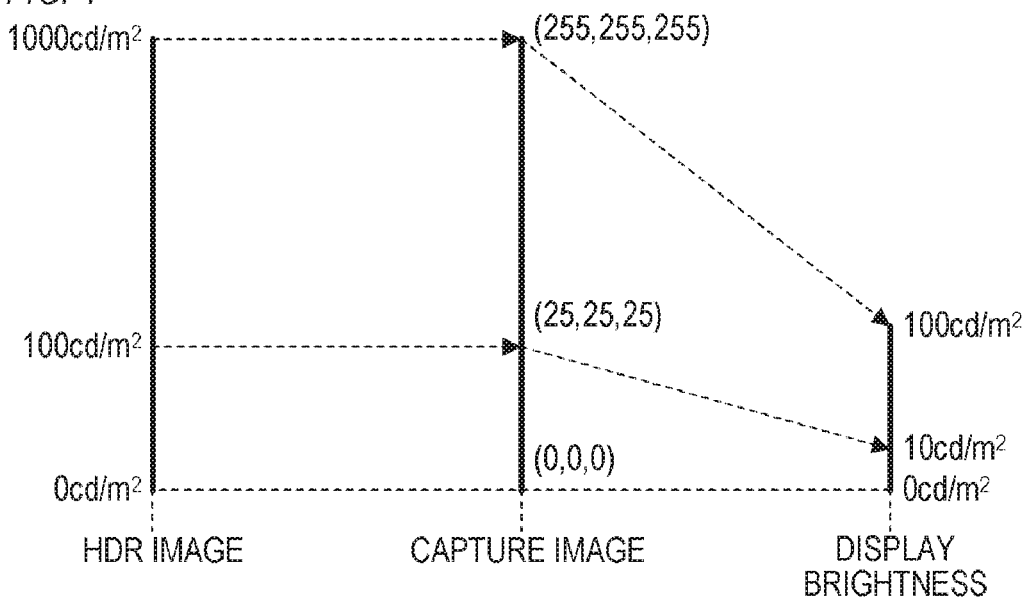
FIG. 4 is a diagram depicting an example of capturing an HDR image according to Example 1.

FIG. 4 is an example in the case where the HDR capture image (HDR capture image recorded in step S106 in FIG. 2) is reproduced by standard image reproduction software and is displayed on the SDR monitor at the upper limit display brightness 100 $cd/m^2$. FIG. 4 indicates the brightness of the HDR image, the pixel values (RGB values) of the HDR capture image, and the display brightness of the HDR monitor.

In FIG. 4, just like FIG. 14A, the RGB values (255, 255, 255) of the HDR capture image are acquired for the brightness 1000 $cd/m^2$ of the HDR image. The RGB values (255, 255, 255) of the HDR capture image are displayed at the display brightness 100 $cd/m^2$ on the SDR monitor. The RGB values (25, 25, 25) of the HDR capture image are acquired for the brightness 100 $cd/m^2$ of the HDR image. The RGB values (25, 25, 25) of the HDR capture image are displayed at the display brightness 10 $cd/m^2$ on the SDR monitor.

In this way, in Example 1, the SDR image is captured darker in accordance with the HDR maximum brightness. Thereby when the capture image is displayed, both the brightness range 0 to 100 $cd/m^2$ of the HDR image and the brightness range 0 to 100 $cd/m^2$ of the SDR image can be displayed in the 0 to 10 $cd/m^2$ brightness range. Therefore, the HDR capture image and the SDR capture image can be compared with each other.

Further, when the HDR capture image is acquired, the HDR range processing is cleared (step S104 in FIG. 2), hence the difference in appearance of the capture images, depending on the display range (HDR range), can be solved.

As described above, according to Example 1, the capture image data is generated with changing the image processing state, whereby capture image data that can be compared with other capture image data can be acquired.

Freeze processing, to stop update of the display target frame, may be performed when the capture processing in FIG. 2 is started. Then the frame corresponding to the capture image recorded in step S101 in FIG. 2 and the frame corresponding to the capture image recorded in step S106 can be matched with certainty.

In Example 1, the image processing unit 102 generates and outputs the image data that is used for both the image data to be outputted to the liquid crystal panel 103 and the image data to be outputted to the image capture unit 105. Therefore, when the image processing state changes in step S104 or S105 in FIG. 2, the display brightness of the display apparatus 100 changes. In this case, the image processing state may be returned to the original state when the capture processing ends in FIG. 2, so that the display brightness of the display apparatus 100 returns to the original display brightness. In concrete turns, in the case where the processing in step S104 is performed to end the capture processing, the HDR range processing is enabled. In the case where the processing in step S105 is performed to end the capture processing, the gain value is changed to 1.

In step S104 in FIG. 2, the image processing to convert the brightness range into a predetermined brightness range (processing to set the display range as the predetermined brightness range) may be performed without clearing (disabling) the HDR range processing. The predetermined brightness range is a brightness range where a fixed brightness (e.g. 1000 $cd/m^2$) is the maximum brightness. In some cases, it may be necessary to confirm the difference in appearance depending on the display range in the captive image. For this, the processing in step S104 may be omitted.

EXAMPLE 2

Example 2 of the present invention will be described. In the following, aspects (e.g. configuration, processing) that are different from Example 1 will be described in detail, and description on aspects that are the same as Example 1 will be omitted. In Example 2, the capture processing in the case where the HDR image and the SDR image are displayed side-by-side (two-screen display) will be described.

Figure 5:
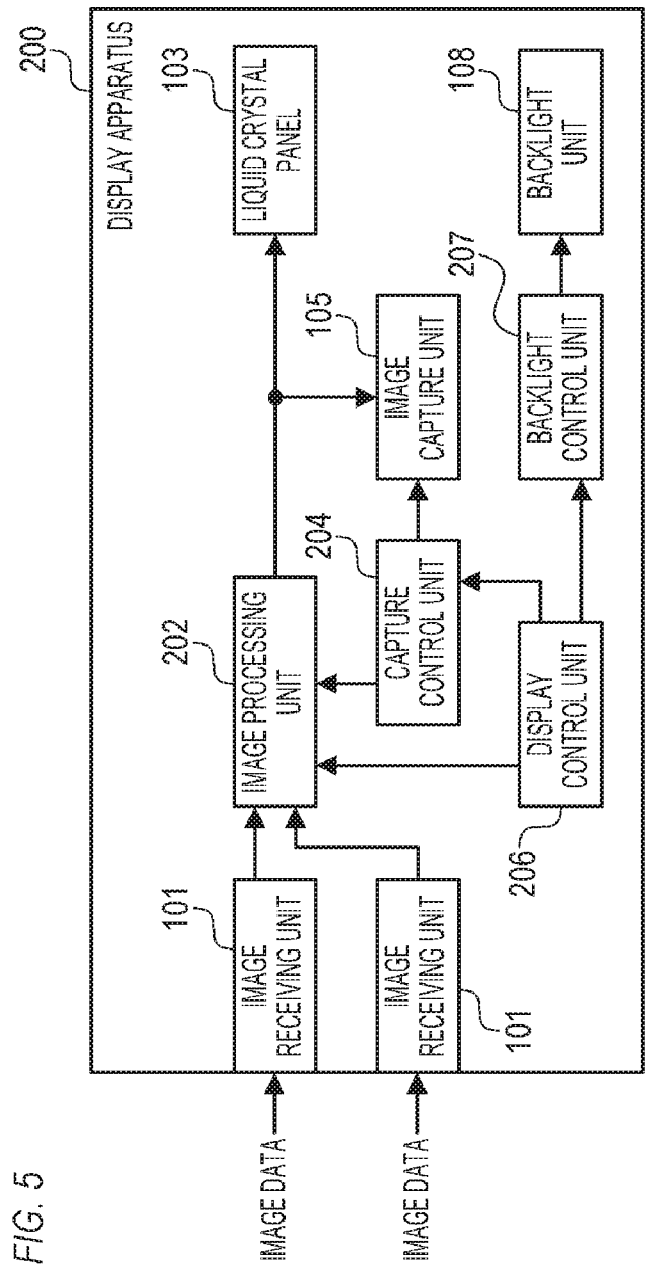
FIG. 5 is a block diagram depicting a configuration example of a display apparatus according to Example 2.

FIG. 5 is a block diagram depicting a configuration example of a display apparatus 200 according to Example 2. In FIG. 5, a same block as in FIG. 1 (Example 1) is denoted with the same reference sign. The display apparatus 200 includes two image receiving units 101, an image processing unit 202, the liquid crystal panel 103, a capture control unit 204, the image capture unit 105, a display control unit 206, a backlight control unit 207, and the backlight unit 108. In Example 2, it is assumed that image data (first image data) received by one of the two image receiving units 101 is the HDR image data, and image data (second image data) received by the other of the two image receiving units 101 is the SDR image data.

Figure 6:
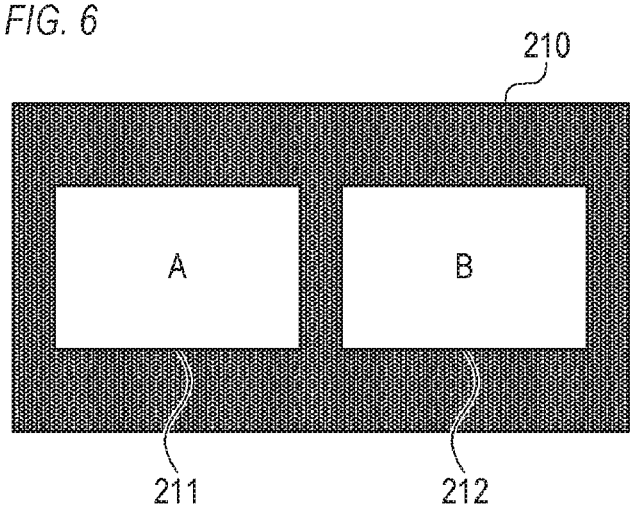
FIG. 6 is a diagram depicting an example of a composite image according to Example 2.

The image processing unit 202 has similar functions to those of the image processing unit 102, of Example 1. The image processing unit 202, however, independently performs image processing on the first image data and the second image data respectively. In other words, the image processing unit 202 generates the first processed image data by performing image processing on the first image data, and generates the second processed image data by performing image processing on the second image data. Then the image processing unit 202 generates composite image data by combining the first processed image data and the second processed image data, and outputs the composite image data to the liquid crystal panel 103 and the image capture unit 105. The composite image data is a composite image in which two images, corresponding to the first processed image data and the second processed image data respectively, are disposed. FIG. 6 indicates an example of the composite image. In the composite image 210 in FIG. 6, an image 211 expressed by the first processed image data and the image 212 expressed by the second processed image data are disposed side-by-side. A number of images disposed in the composite image and the layout of the images in the composite image are not especially limited. For example, three or more images may be disposed in the composite image, or a plurality of images may be disposed vertically in the composite image, or a plurality of images may be disposed in a matrix in the composite image.

The capture control unit 204 has similar functions to those of the capture control unit 104 of Example 1. The capture control unit 204, however, outputs an instruction to the image processing unit 202, so that the image processing state is independently set (changed) for each of the plurality of images disposed in the composite image respectively. In concrete terms, the capture control unit 204 outputs an instruction to the image processing unit 202, so that the image processing state is independently changed for the first image data (first processed image data) and the second image data (second processed image data) respectively.

The display control unit 206 has similar functions as those of the display control unit 106 of Example 1. The display control unit 206, however, independently performs processing similar to Example 1 (setting of display mode, notification of color gamut. EOTF, display range maximum brightness, display mode and the like) for each of the plurality of images disposed in the composite image respectively. In concrete terms, the display control unit 206 sets the display mode and notifies the color gamut, EOTF, display range maximum brightness, display mode in the display range, display mode or the like for the first image data (first processed image data). Further, the display control unit 206 sets the display mode and notifies the color gamut, EOTF, display range maximum brightness, display mode and the like for the second image data (second processed image data). In Example 2, it is assumed that the HDR mode is set for the first image data (first processed image data), and the SDR mode is set for the second image data (second processed image data).

The backlight control unit 207 has similar functions to those of the backlight control unit 107 of Example 1. The backlight control unit 207, however, performs the processing similar to Example 1 for each of the plurality of images disposed in the composite image. In concrete terms, the backlight control unit 207 outputs a backlight control signal to the backlight unit 108, so that the following operations 1 and 2 are implemented.

Operation 1: An area of the backlight unit 108, corresponding to the area in which an image based on the first image data (first processed image data) is displayed, emits light at a light emission brightness in accordance with the display range maximum brightness corresponding to the first image data (first processed image data).

Operation 2: An area of the backlight unit 108, corresponding to the area in which an image based on the second image data (second processed image data) is displayed, emits light at a light emission brightness in accordance with the display range maximum brightness corresponding to the second image data (second processed image data).

Figure 7:
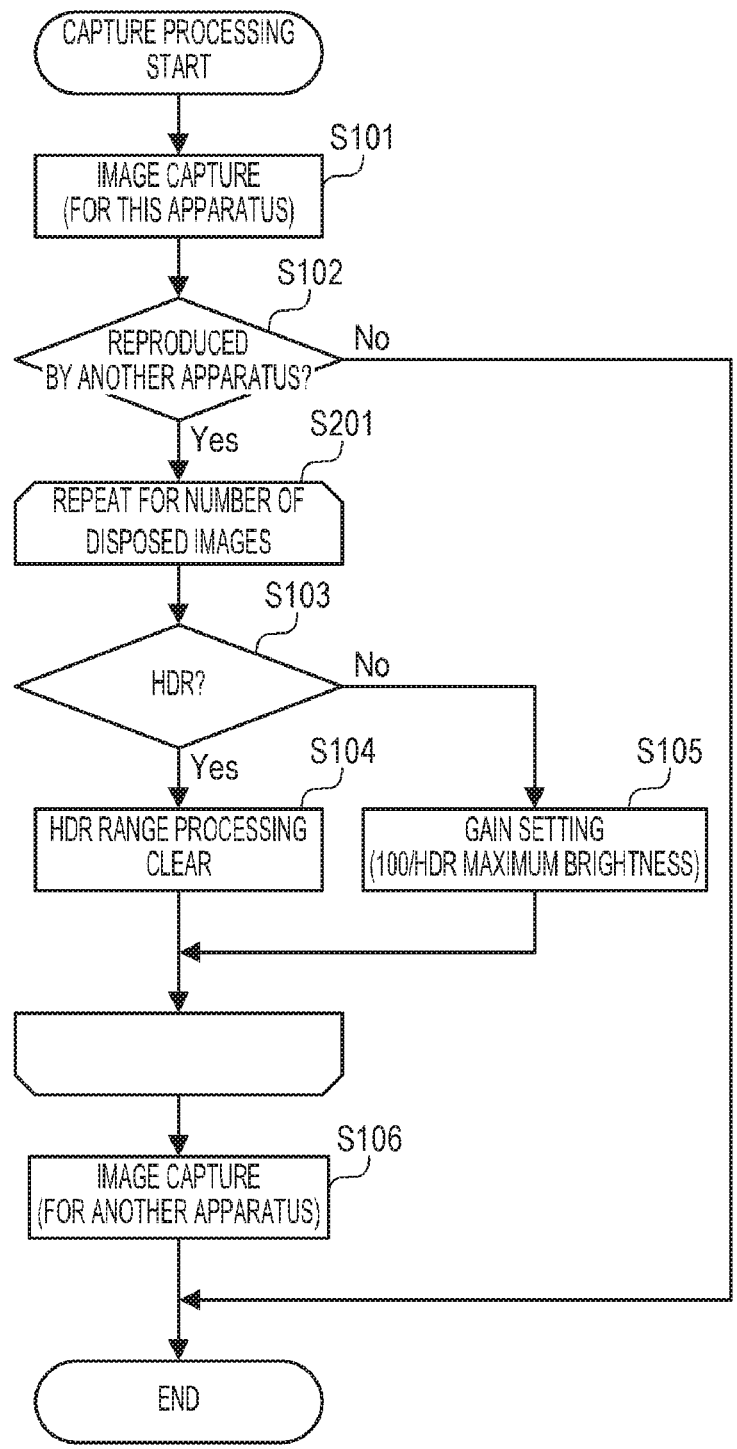
FIG. 7 is a flowable depicting an example of the capture processing according to Example 2.

FIG. 7 is a flow chart depicting an example of capture processing performed by the display apparatus 200. The capture processing in FIG. 7 is implemented in accordance with the capture instruction (capture operation). In FIG. 7, a processing step the same as FIG. 2 (Example 1) is denoted with the same reference sign as FIG. 2. In the capture processing in FIG. 7, the processing in steps S103 to S105 are independently performed for each of the plurality of images disposed in the composite image respectively (step S201; repeat steps S103 to S105).

First, processing in steps S103 to S105 are performed for the image 211 in FIG. 6 (first image data; first processed image data). In Example 2, the first image data is the HDR image data, and the HDR anode is set for the first image data, as mentioned above. Therefore, processing advances from step S103 to step S104 and the HDR range processing for the first image data is cleared.

Then, processing in steps S103 to S105 are performed for the image 212 in FIG. 6 (second image data; second processed image data). In Example 2, the second image data is the SDR image data, and the SDR mode is set for the second image data, as mentioned above. Therefore, processing advances from step S103 to step S105, and the image processing to decrease each pixel value by the gain value is performed for the second image data (second processed image data). Here it is assumed that 1000 cd/m$^2$, which is the maximum brightness (upper limit brightness) in the brightness range of the first image data, is used as the HDR maximum brightness, and 0.1 is calculated as the gain value. Then processing advances to step S106.

Figure 8:
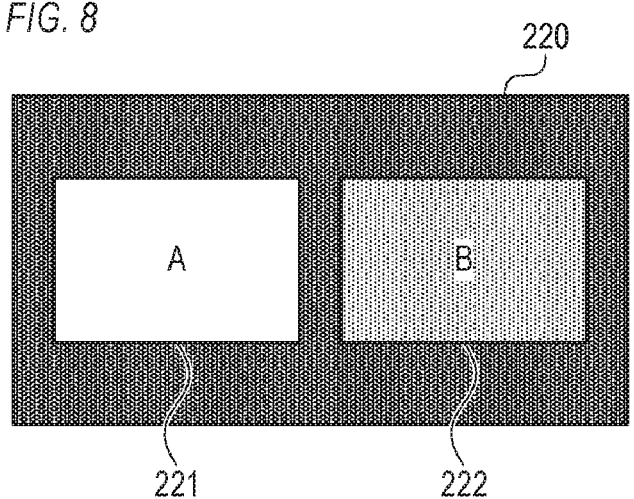
FIG. 8 is a diagram depicting an example of the capture image according to Example 2.

FIG. 8 is an example of a capture image according to Example 2. The capture image 220 in FIG. 8 is an image which is generated by capturing the composite image 210 in FIG. 6, and in which an image 221 corresponding to the image 211 (first image data; first processed image data) and an image 222 corresponding to the image 212 (second image data; second processed image data) are disposed. By the capture processing in FIG. 7, the image 221 becomes an image for which the HDR range processing has not been performed, and the image 222 becomes an image for which the image processing, to decrease each pixel value by the gain value (0.1), has been performed. Just like Example 1, when the capture image is displayed, both the brightness range 0 to 100 cd/m$^2$ of the first image data and the brightness range 0 to 100 cd/m$^2$ of the second image data can be displayed in the same brightness range. Therefore, the image 221 and the image 222 can be compared with each other.

As described above, according to Example 2, in the case of displaying a composite image in which a plurality of images are disposed (in the case where a plurality of display target images exist), the capture image data, which allows comparing the plurality of images, can be acquired using the processing similar to Example 1.

An example of controlling the light emission brightness of the backlight unit 108 based on the display range maximum brightness of each image was described, but the control method for the display brightness is not limited to this. For example, the display brightness may be controlled by image processing.

Further, an example of inputting the HDR image data and the SDR image data to the display apparatus 200 was described, but the present invention is not limited to this. For example, the HDR image data may be inputted to the display apparatus 200, so that a copy of the inputted HDR image data is generated in the display apparatus 200, and one of the two HDR image data is converted into the SDR image data.

The display mode may he settable for each of the plurality of areas in one image respectively. Then the image processing state may be independently changed for each of the plurality of areas respectively. For example, the HDR mode may be set for the left half of one HDR image, and the HDR to SDR mode may be set for the right half of the HDR image. In this case, the left half is displayed in HDR anode, and the right half is displayed in SDR mode. Then when the image is captured, the HDR range processing is cleared for the left half, and image processing, to decrease each pixel value, is performed for the right half The plurality of display modes may include a comparison mode in which the HDR image is displayed in a first area on the display surface, and the SDR image is displayed in a second area on the display surface. In the comparison mode, processing similar to the HDR processing mode is performed for the first area, and processing similar to the SDR processing mode is performed for the second area.

The capture image may be independently acquired for each of the plurality of images disposed in the composite image respectively, or the capture image may be independently acquired for each of the plurality of areas in one image respectively. For example, the capture image (image 221 in FIG. 8) corresponding to the image 211 in FIG. 6, and the capture image (image 222 in FIG. 8) corresponding to the image 212 in FIG. 6 may be acquired independently.

EXAMPLE 3

Figure 9:
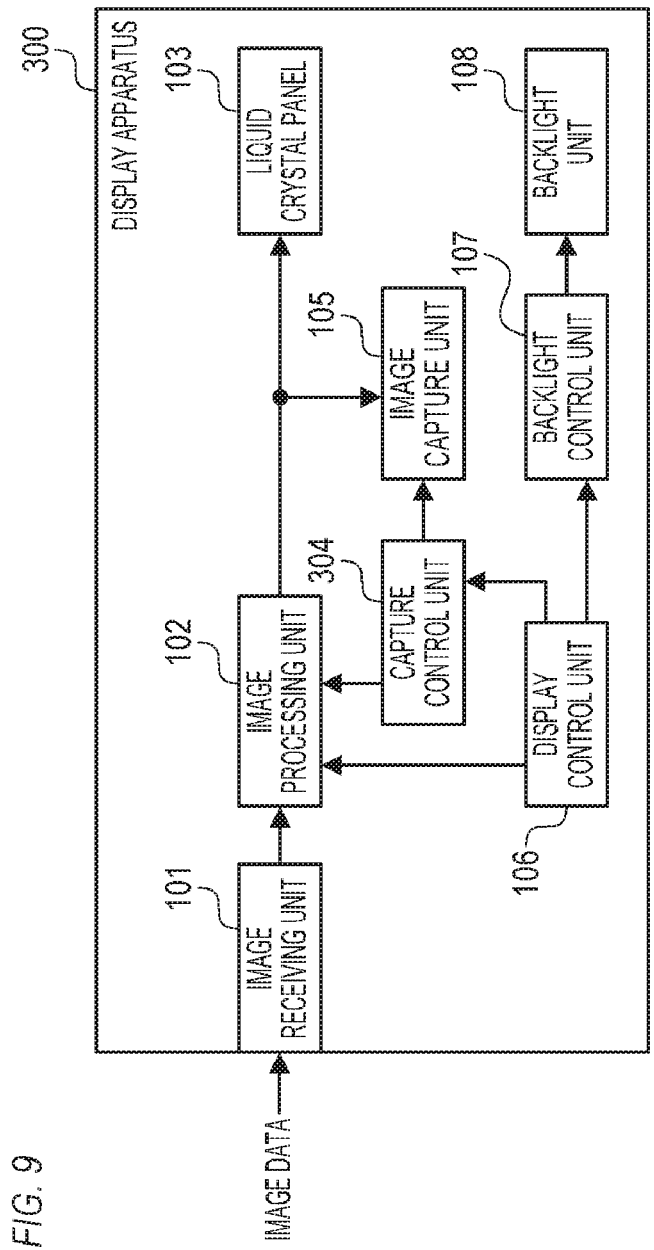
FIG. 9 is a block diagram depicting a configuration example of a display apparatus according to Example 3.

Example 3 of the present invention will be described. In the following, aspects (e.g. configuration, processing) that are different from Example 1 will be described in detail, and description on aspects that are the same as Example 1 will be omitted. In Example 3, an example of calculating the gain value based not on the HDR maximum brightness but on the display range maximum brightness (upper limit display brightness) will be described, FIG. 9 is a block diagram depicting a configuration example of a display apparatus 300 according to Example 3. In FIG. 9, a same block as in FIG. 1 (Example 1) is denoted with the same reference sign as in FIG. 1. The display apparatus 300 includes the image receiving unit 101, the image processing unit 102, the liquid crystal panel 103, a capture control unit 304, the image capture unit 105, the display control unit 106, the backlight control unit 107, and the backlight unit 108. In the display apparatus 300, the upper display brightness can be set up to 1000 cd/m$^2$.

The capture control unit 304 has similar functions to those of the capture control unit 104 of Example 1. The capture control unit 304, however, calculates the gain value based not on the HDR maximum brightness, but on the display range maximum brightness (upper limit display brightness).

Figure 10:
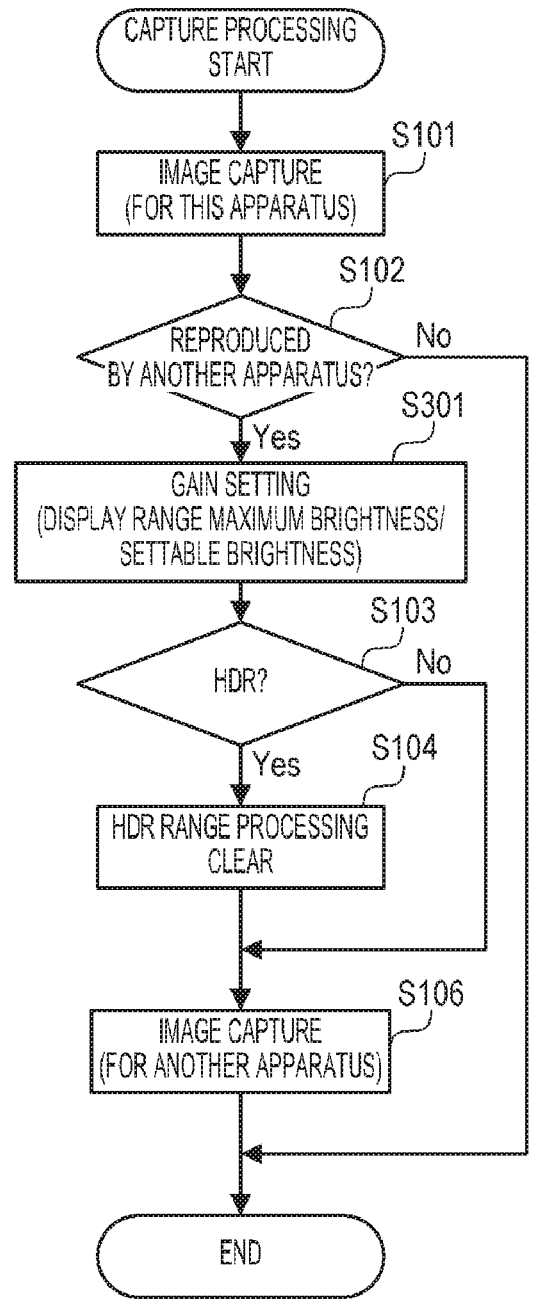
FIG. 10 is a flow chart depicting an example of the capture processing according to Example 3.

FIG. 10 is a flow chart depicting an example of capture processing performed by the display apparatus 300. The capture processing in FIG. 10 is implemented in accordance with the capture instruction (capture operation). In FIG. 10, a processing step that is the same as FIG. 2 (Example 1) is denoted with the same reference sign as FIG. 2. In the capture processing in FIG. 10, the processing in step S105 in FIG. 2 is not performed, but the processing in step S301 is performed.

As described in Example 1, in step S102, the capture control unit 304 determines whether or not the capture image is reproduced by another apparatus. Then, processing advances to step S301 if it is determined that the capture image is reproduced by another apparatus, or the capture processing ends if not.

In step S301, the capture control unit 304 calculates the gain value from the display range maximum brightness (upper limit display brightness) using the following Expression 2 and notifies the calculated gain value to the image processing unit 102. This allows the image processing unit 102 to perform processing to multiply each pixel value of the image data by the gain value notified from the capture control unit 304 (image processing state is changed). The "settable brightness" in Expression 2 is a brightness that can be set as the display range maximum brightness (upper limit display brightness) and is 1000 cd/m$^2$ in Example 3. According to Expression 2, the gain value that is smaller as the display range maximum brightness (upper limit display brightness) is lower and that is smaller than 1, is calculated. For example, in the case where the settable brightness is 1000 cd/m$^2$ and the display range maximum brightness is 600 cd/m$^2$, the gain value 0.6 is calculated.

$$\text{Gain value} = \text{display brightness range maximum brightness/settable brightness} \quad \text{(Expression 2)}$$

As described above, according to Example 3, each pixel value is decreased by the smaller gain value as the upper limit display brightness is lower. Thereby capture image data that can be compared with other capture image data can be acquired. Further, the image processing to decrease each pixel value is performed, regardless whether the capture target image is an HDR image or an SDR image. Hence the difference of brightness due to the difference of the MDR range can be confirmed in the capture image.

To solve the difference of brightness of the capture image due to the difference of the HDR range, conditions to perform the processing in step S301 may be changed. In concrete terms, the processing in step S301 is performed only when the capture target image is the SDR image, just like step S105 in FIG. 2. To solve the difference of the gradation characteristic due to the difference in the HDR range, the processing in step S104 may be omitted.

EXAMPLE 4

Example 4 of the present invention will be described. In the following, aspects (e.g. configuration, processing) that are different from Example 1 will be described in detail, and description on aspects that are the same as Example 1 will be omitted. In Example 4, an example where an SDR image generated by converting an HDR image is also captured when the HDR image is captured will be described.

Figure 11:
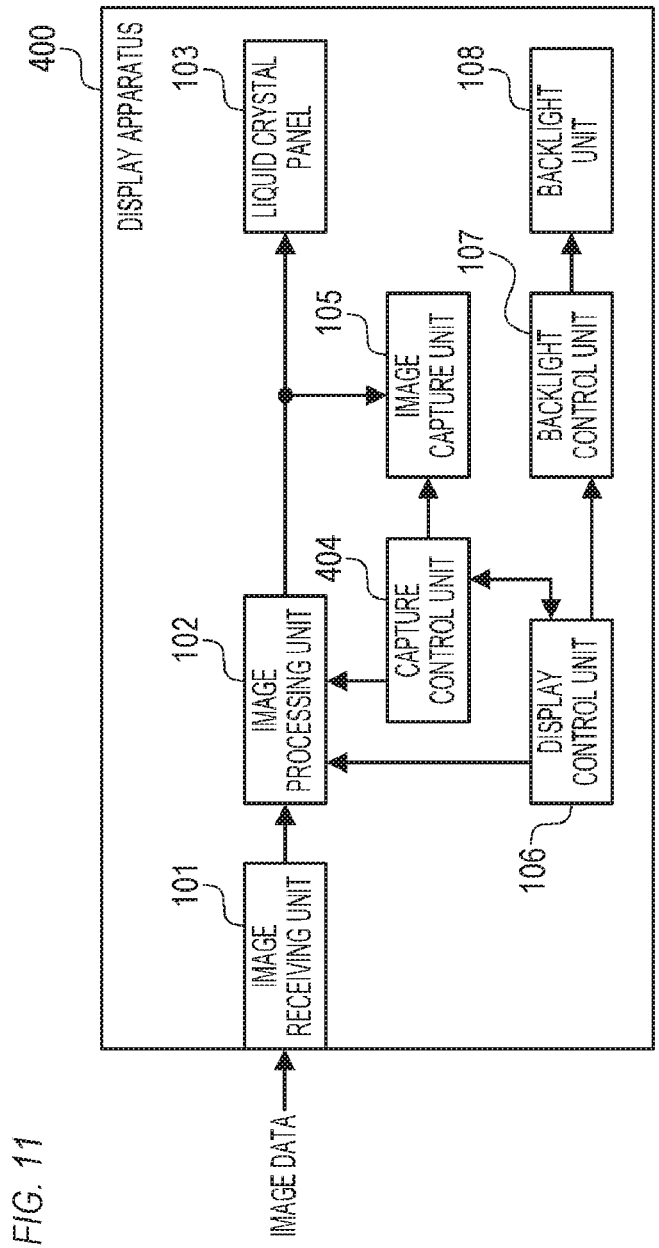
FIG. 11 is a block diagram depicting a configuration example of a display apparatus according to Example 4.

FIG. 11 is a block diagram depicting a configuration example of a display apparatus 400 according to Example 4. In FIG. 11, a same block as in FIG. 1 (Example 1) is denoted with the same reference sign as in FIG. 1. The display apparatus 400 includes the image receiving unit 101, the image processing unit 102, the liquid crystal panel 103, a capture control unit 404, the image capture unit 105, the display control unit 106, the backlight control unit 107, and the backlight unit 108.

The capture control unit 404 has similar functions to those of the capture control unit 104 of Example 1. However, when the HDR mode is set, the capture control unit 404 sends various instructions so that the HDR to SDR mode is set after the HDR capture image is recorded, and the SDR capture image, corresponding to the HDR capture image, is recorded.

Figure 12:
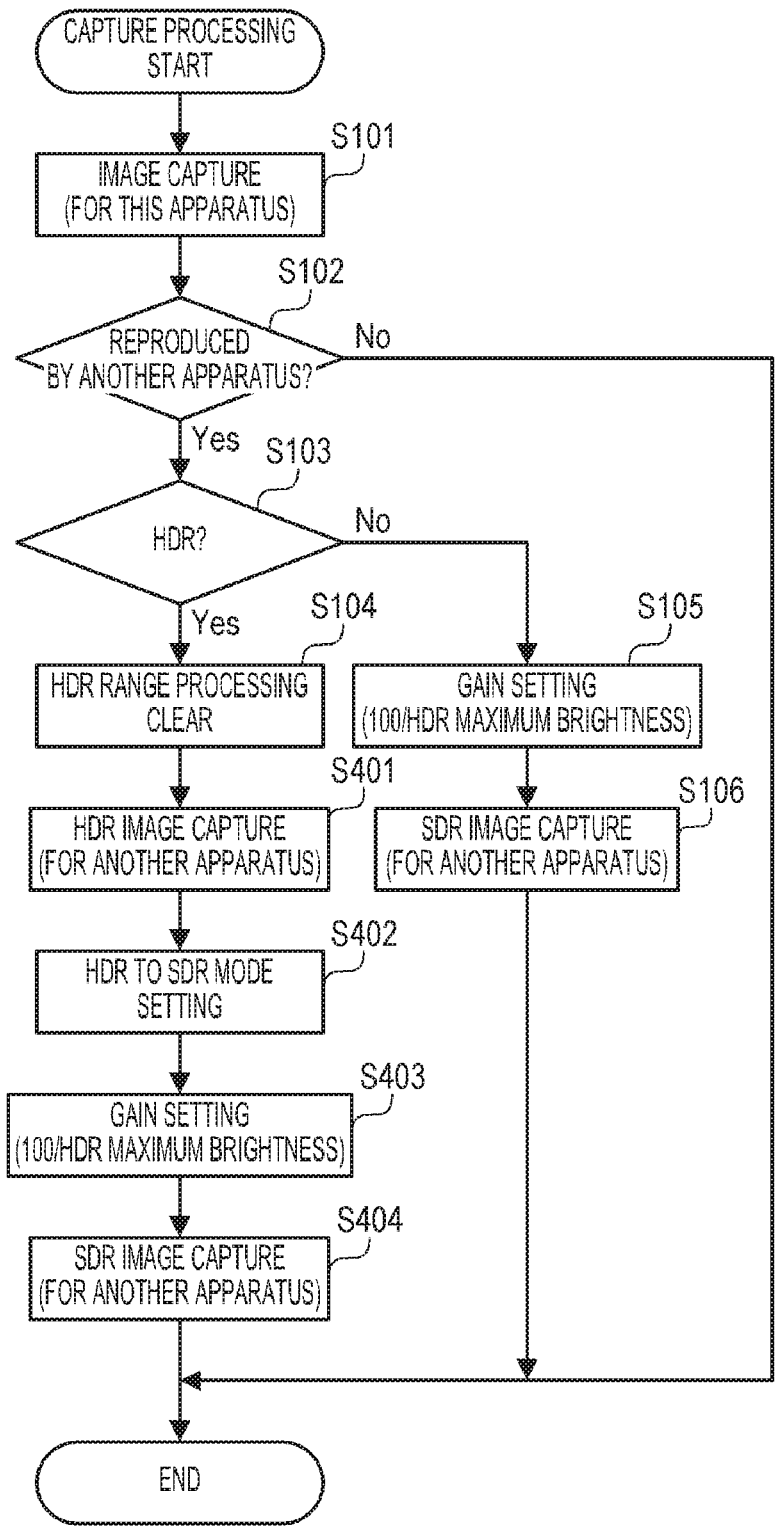
FIG. 12 is a flow chart depicting an example of the capture processing according to Example 4.

FIG. 12 is a flow chart depicting an example of capture processing performed by the display apparatus 400. The capture processing in FIG. 12 is implemented in accordance with the capture instruction (capture operation). In FIG. 12, a processing step that is the same as FIG. 2 (Example 1) is denoted with the same reference sign as FIG. 2. In the capture processing in FIG. 12, the processing in steps S401 to S404 are performed after the processing in step S104.

In step S401, the capture control unit 404 outputs an instruction to the image capture unit 105, whereby the image capture unit 105 records (captures) the image data outputted from the image processing unit 102 in the storage medium as the capture image data. The processing in step S401 is the same as the processing in step S106. In step S401, however, HDR capture image data (for another apparatus to reproduce the capture image) is recorded.

In step S402, the capture control unit 404 outputs an instruction to the display control unit 106 to change the currently set display mode (the HDR mode) to the HDR to SDR mode. Thereby the HDR to SDR mode is set.

In step S403, the capture control unit 404 calculates the gain value based on the HDR range maximum brightness using Expression 1 described in Example 1 and notifies the calculated gain value to the image processing unit 102. This allows the image processing unit 102 to perform processing to multiply each pixel value of the image data by the gain value notified from the capture control unit 404 (image processing state is further changed). The processing in step S403 is the same as the processing in step S105.

In step S404, the capture control unit 404 outputs an instruction to the image capture unit 105, whereby the image capture unit 105 records (captures) the image data outputted from the image processing unit 102 in the storage medium as the capture image data. The processing in step S404 is similar to the processing in step S106 or S401. In step S404, however, the SDR capture image data (for another apparatus to reproduce the capture image) is recorded.

As described above, according to Example 4, after the HDR capture image is acquired, the SDR capture image corresponding to this HDR capture image is automatically acquired. In other words, the HDR capture image and the SDR capture image, which correspond to each other, can be acquired by one capture operation. There are many opportunities to compare the HDR capture image and the SDR capture image which correspond to each other, hence this processing in Example 4 makes the image processing apparatus more user friendly.

EXAMPLE 5

Example 5 of the present invention will be described. In the following, aspects (e.g. configuration, processing) that are different from Examples 1 and 3 will be described in detail, and description on aspects that are the same as Examples 1 and 3 will be omitted. In Example 5, a case where the image processing apparatus that performs the capture processing is a separate apparatus from the display apparatus will be described.

FIG. 13 is a block diagram depicting a configuration example of a display system according to Example 5. In FIG. 13, a same block as in FIG. 1 (Example 1) is denoted with the same reference sign as in FIG. 1. The display system according to Example 5 includes an image processing apparatus 500 and a display apparatus 600. The image processing apparatus 500 is a personal computer, for example.

The image processing apparatus 500 includes an image generation unit 501, the image processing unit 102, an image transmission unit 503, a capture control unit 504, the image capture unit 105, an image processing control unit 505 and a communication unit 506.

The image generation unit 501 generates image data, such as an operation screen and a screen of an application that operates on the image processing apparatus 500. The image generation unit 501 generates MDR image data or SDR image data depending on the case. Then the image generation unit 501 outputs the generated image data to the image processing unit 102.

The image transmission unit 503 outputs the image data outputted from the image processing unit 102 to outside the image processing apparatus 500. In concrete terms, the image transmission unit 503 includes an SDI output terminal which conforms to SDI standards, and converts the image data, which was outputted from the image processing unit 102, into SDI signals, and outputs the SDI signals from the SDI output terminal. In Example 5, the image data is outputted from the image transmission unit 503 to the display apparatus 600 (image receiving unit 101).

The capture control unit 504 has similar functions to those of the capture control unit 304 of Example 3. The capture control unit 504, however, acquires information required for processing from the image processing control unit 505 and the communication unit 506.

The image processing control unit 505 has similar functions to those of the display control unit 106 of Example 1. The processing mode of Example 5, however, is different from the processing mode (display mode) of Example 1, and the display range is not supported in the processing mode of Example 5 (color gamut and EOTF are supported).

The communication unit 506 can communicate with an external apparatus. The standards on communication by the communication unit 506 are not especially limited. Communication by the communication unit 506 may be wireless or cable. In Example 5, the communication unit 506 performs Ethernet communication with the display apparatus 600 (later-mentioned communication unit 604) via a LAN cable. The communication unit 506 sends a brightness acquisition command to the display apparatus 600 in accordance with the brightness acquisition request from the capture control unit 504. Further, the communication unit 506 notifies the brightness information sent from the display apparatus 600 to the capture control unit 504. The brightness information indicates at least the display brightness range maximum brightness and the settable brightness.

The display apparatus 600 includes the image receiving unit 101, an image processing unit 601, the liquid crystal panel 103, an operation input unit 602, a display control unit 603, a communication unit 604, the backlight control unit 107 and the backlight unit 108.

The image processing unit 601 performs the image processing (e.g. color gamut correction, gamma correction) on the image data outputted from the image receiving unit 101, based on the instruction from the display control unit 603. Then the image processing unit 601 outputs the image data after the image processing to the liquid crystal panel 103.

The operation input unit 602 receives user operation on the display apparatus 600 (e.g. buttons disposed on the display apparatus 600), and outputs signals (information) in accordance with the user operation. For example, the operation input unit 602 notifies the specified upper limit display brightness to the display control unit 603 in accordance with the user operation that specifies the upper limit display brightness.

The display control unit 603 instructs the image processing unit 601 to execute the image processing (e.g. color gamut correction, gamma correction). The display control unit 603 notifies the upper limit display brightness (display range maximum brightness) notified from the operation input unit 602 to the backlight control unit 107. Further, in the case where the brightness acquisition command is received from the image processing apparatus 500 (communication unit 506) via the communication unit 604, the display control unit 603 notifies the brightness information to the communication unit 604.

The communication unit 604 has similar functions to those of the communication unit 506. In Example 5, however, the communication unit 604 performs Ethernet communication with the image processing apparatus 500 (communication unit 506) via a LAN cable. The communication unit 604 sends (transfers) the brightness acquisition command, which was sent from the image processing apparatus 500, to the display control unit 603. The communication unit 604 also sends the brightness information, which was notified from the display control unit 603, to the image processing apparatus 500.

As described above, according to Example 5, the capture processing similar to Example 3 is performed in the case where the image processing apparatus that performs the capture processing is an apparatus that is separated from the display apparatus. Thereby capture image data that can be compared with other capture image data can be acquired.

Each block of Examples 1 to 5 (FIGS. 1, 5, 9, 11, 13) may or may not be independent hardware. The functions of at least 2 blocks may be implemented by common hardware. Each of a plurality of functions of one block may be implemented by independent hardware. At least two functions of one block may be implemented by common hardware. Each block may or may not be implemented by hardware. For example, the apparatus may include a processor and a memory storing a control program. Further, at least a part of the blocks of the apparatus may be implemented by the processor reading the control program from the memory and executing the control program.

Examples 1 to 5 (including the above-mentioned modifications) are merely examples, and configurations acquired by appropriately modifying or changing the configurations in Example 1 to 5, within the scope of the essence of the present invention, are also included in the present invention. Configuration acquired by appropriately combining the configurations of Example 1 to 5 are also included in the present invention.

According to the present disclosure, capture image data that can be compared with other capture image data can be acquired.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-201958, filed on Oct. 26, 2018, which is hereby incorporated by reference herein in its entirety

What is claimed is:

1. An image processing apparatus comprising at least one memory and at least one processor which function as:
   a setting unit configured to be capable of setting any of a plurality of processing modes which include a first processing mode to display an image having a first brightness range and a second processing mode to display an image having a second brightness range which is narrower than the first brightness range;
   a processing unit configured to generate frame image data, which is a display target, in a first state in which image processing in accordance with a currently set processing mode is performed, and generates a capture image data corresponding to the frame image data in a second state after changing the first state in accordance with the currently set processing mode, the capture image data being different from the frame image data; and
   an image capture unit configured to record image data in a storage medium,
   wherein the processing unit outputs the frame image data to a display panel, and outputs the capture image data to the image capture unit.

2. The image processing apparatus according to claim 1, wherein the second state in a case where the second processing mode is set is a state of performing image processing to decrease each pixel value of the frame image data.

3. The image processing apparatus according to claim 2, wherein the image processing to decrease each pixel value of the frame image data is image processing to decrease each pixel value of the frame image data using a gain value that is smaller as a maximum brightness or an upper limit brightness of image data, which corresponds to the frame image data and has a brightness range that is wider than the second brightness range, is higher.

4. The image processing apparatus according to claim 2, wherein the image processing to decrease each pixel value of the frame image data is image processing to decrease each pixel value of the frame image data using a gain value that is smaller as an upper limit display brightness of a display apparatus, which displays an image based on the frame image data, is lower.

5. The image processing apparatus according to claim 4, wherein the second state in a case where the first processing mode is set is also a state of performing the image processing to decrease each pixel value of the frame image data.

6. The image processing apparatus according to claim 1, wherein the second state in a case where the first processing mode is set is a state of not performing image processing to convert a brightness range into the first brightness range.

7. The image processing apparatus according to claim 1, wherein the setting unit is further capable of setting any of a plurality of brightness ranges as the first brightness range,
   wherein the second state in a case where the first processing mode is set is a state of performing image processing to convert a brightness range into a predetermined brightness range.

8. The image processing apparatus according to claim 1, wherein the processing unit generates first capture image data corresponding to the frame image data in the first state and generates second capture image data corresponding to the frame image data in the second state.

9. The image processing apparatus according to claim 1, wherein
   in a case where the first processing mode is set,
   the processing unit generates second capture image data in a second state after changing the first state in accordance with the first processing mode,
   the setting unit sets the second processing mode, and
   the processing unit generates third capture image data in a second state after changing the first state in accordance with the second processing mode.

10. The image processing apparatus according to claim 1, wherein
in a case where a plurality of frame image data exist as the display target,
the setting unit is capable of independently setting a processing mode for each of the plurality of frame image data, and
the processing unit independently sets the second state for each of the plurality of frame image data.

11. The image processing apparatus according to claim 1, wherein the setting unit is capable of independently setting a processing mode for each of a plurality of areas in an image expressed by the frame image data,
wherein the processing unit independently sets the second state for each of the plurality of areas.

12. The image processing apparatus according to claim 1, wherein the plurality of processing modes include a third processing mode to display an image having the first brightness range in a first area on the display surface, and display an image having the second brightness range in a second area on a display surface,
wherein in a case where the third processing mode is set, the processing unit sets a second state, which is a state after changing the first state in accordance with the first processing mode, with respect to the first area, and sets a second state which is a state after changing the first state in accordance with the second processing mode, with respect to the second area.

13. The image processing apparatus according to claim 1, wherein the image processing apparatus is a display apparatus configured to display an image based on the frame image data.

14. The image processing apparatus according to claim 1, wherein the first brightness range is a high dynamic range (HDR), and the second brightness range is a standard dynamic range (SDR).

15. The image processing apparatus according to claim 1, wherein the image capture unit generates still image data in JPEG or bit map format from the capture image data, and records the still image data in the storage medium.

16. An image processing method comprising:
setting any of a plurality of processing modes which include a first processing mode to display an image having a first brightness range and a second processing mode to display an image having a second brightness range which is narrower than the first brightness range;
generating frame image data, which is a display target, in a first state in which image processing in accordance with a currently set processing mode is performed, and generates a capture image data corresponding to the frame image data in a second state after changing the first state in accordance with the currently set processing mode, the capture image data being different from the frame image data; and
recording image data in a storage medium,
wherein the frame image data is outputted to a display panel, and the capture image data is outputted to be recorded in the storage medium.

17. A non-transitory computer readable medium that stores a program, wherein the program causes a computer to execute:
setting any of a plurality of processing modes which include a first processing mode to display an image having a first brightness range and a second processing mode to display an image having a second brightness range which is narrower than the first brightness range;
generating frame image data, which is a display target, in a first state in which image processing in accordance with a currently set processing mode is performed, and generates a capture image data corresponding to the frame image data in a second state after changing the first state in accordance with the currently set processing mode, the capture image data being different from the frame image data; and
recording image data in a storage medium,
wherein the frame image data is outputted to a display panel, and the capture image data is outputted to be recorded in the storage medium.

* * * * *